United States Patent [19]

Takahashi

[11] Patent Number: 4,550,356

[45] Date of Patent: Oct. 29, 1985

[54] CIRCUIT BREAKER

[75] Inventor: Isao Takahashi, Hitachi, Japan

[73] Assignee: Hitachi, Ltd., Tokyo, Japan

[21] Appl. No.: 559,085

[22] Filed: Dec. 7, 1983

[30] Foreign Application Priority Data

Dec. 9, 1982 [JP] Japan ............................... 57-214676

[51] Int. Cl.$^4$ ............................................... H02H 7/22

[52] U.S. Cl. .......................................... 361/9; 361/13; 361/11

[58] Field of Search ..................... 361/8, 13, 9, 10, 11, 361/2, 3, 6; 307/134, 135, 137

[56] References Cited

U.S. PATENT DOCUMENTS

| | | | |
|---|---|---|---|
| 3,534,226 | 10/1970 | Lian | 361/9 |
| 3,538,277 | 11/1970 | Phillips | 361/13 X |
| 3,566,152 | 2/1971 | Casey et al. | 361/10 X |
| 4,347,539 | 8/1982 | Peterson et al. | 361/9 X |

FOREIGN PATENT DOCUMENTS

| | | | |
|---|---|---|---|
| 2421885 | 11/1975 | Fed. Rep. of Germany | 361/8 |

*Primary Examiner*—Patrick R. Salce

*Attorney, Agent, or Firm*—Antonelli, Terry & Wands

[57] ABSTRACT

Disclosed is a circuit breaker comprising an interruptor including a main contact and a series circuit connected in parallel to the main contact and constituted by a breaking resistor and a resistor contact; and an actuator device for performing closing to opening operations of the main contact and the resistor contact; in which the breaking resistor includes a first resistor element and a second resistor element having a resistance value which is smaller than that of the first resistor element; and in which a switching circuit is provided for automatically changing the connection of the first and second resistor elements such that in small capacitive current breaking, an equivalent resistance of the first and second resistor element becomes a large value suitable for the small current breaking, while in short-circuit current breaking, the resultant equivalent resistance becomes a small value for the short-circuit current breaking mainly owing to the resistance value of said second resistor element.

11 Claims, 9 Drawing Figures

CIRCUIT BREAKER

The present invention relates to circuit breakers and more particularly to a power circuit breaker provided with a resistor contact.

A puffer type $SF_6$ circuit breaker, which occupies the main current of present power circuit breakers, has a feature that not only the arc-extinguishing medium $SF_6$ gas is superior in the characteristic of breaking a large current but the chopped current is small in breaking a small current so that no overvoltage can occur in breaking an exciting current of a no-load transformer.

Accordingly, no resistor for breaking operation (hereinafter referred to as a breaking resistor) has been required for such a puffer type $SF_6$ circuit breaker, differing from a compressed-air circuit breaker, while a resistor for suppressing a making surge is required in view of such a circuit phenomenon for a circuit breaker of the class above 500 kV.

However, with respect to the 1000 kV class UHV (ultra high voltage) transmission, the actual operation of which is expected to be initiated about ten years later, there is a tendency to suppress the surge occurring in the transmission line to a low value to save the construction cost of appliances, and therefore a breaking resistor for suppressing a surge in breaking a short-circuit current has become required to be provided in a puffer type $SF_6$ gas circuit breaker. As an example of the result of analysis as to UHV, it is said that the resistance value of the breaking resistor be preferably about 500–1000 Ω/phase.

One of the important items in research development is the breaking operation of a small capacitive current. As to a small capacitive current breaking, in the prior art, the voltage duty across the breaking resistor contact could not so largely be reduced as the voltage duty across the main contact could be reduced by using such a breaking resistor, as will be described in detail later. Recently, the IEC publication with respect to a small capacitive current breaking has a tendency to proceed toward severity in view of various kinds of fault conditions and therefore further reduction of the voltage duty across the breaking contact is expected.

An object of the invention is to improve the prior art in reduction of the voltage duty across the breaking resistor contact with respect to a small capacitive current breaking.

Another object of the present invention is to provide a circuit breaker in which the breaking performance for a small capacitive current can be greatly improved without spoiling the surge suppression effect in breaking a short-circuit current.

To attain these objects, according to the present invention, the circuit breaker is featured in that first and second resistor elements having large and small resistance values respectively are provided as a breaking resistor and the connection of the first and second resistor elements is automatically changed such that the resultant resistance value becomes large to be suitable for a small capacitive current breaking mainly owing to the resistance value of the first resistor element in breaking a small capacitive current, while becomes small to be suitable for a short-circuit current breaking mainly owing to the resistance value of the second resistor element in breaking a short-circuit current.

These and other objects and the attendant advantages of the present invention will be readily appreciated as the same becomes better understood by reference to the following detailed description when considered in connection with the accompanying drawings, in which.

Prior to the description of preferred embodiments of the present invention, the prior art of the invention will be described by referring to FIGS. 1 and 2 for the better understanding of the invention.

Figure 1:
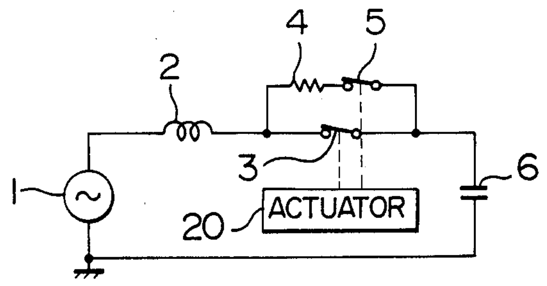
FIG. 1 PRIOR ART
FIG. 1 is a circuit diagram of a power transmission line provided with a breaking section of a conventional circuit breaker.

Referring to FIG. 1, description will be first made as to the small capacitive current breaking. In the drawing, the reference numeral 1 designates a power source, 2 an inductance of the power source, 3 a main breaking contact, 4 a breaking resistor element, 5 a resistor contact, 6 a capacitor when the line is simulated by a lumped constant, and 20 an actuator for performing on/off operation of the main and resistor contacts 3 and 5.

Figure 2:
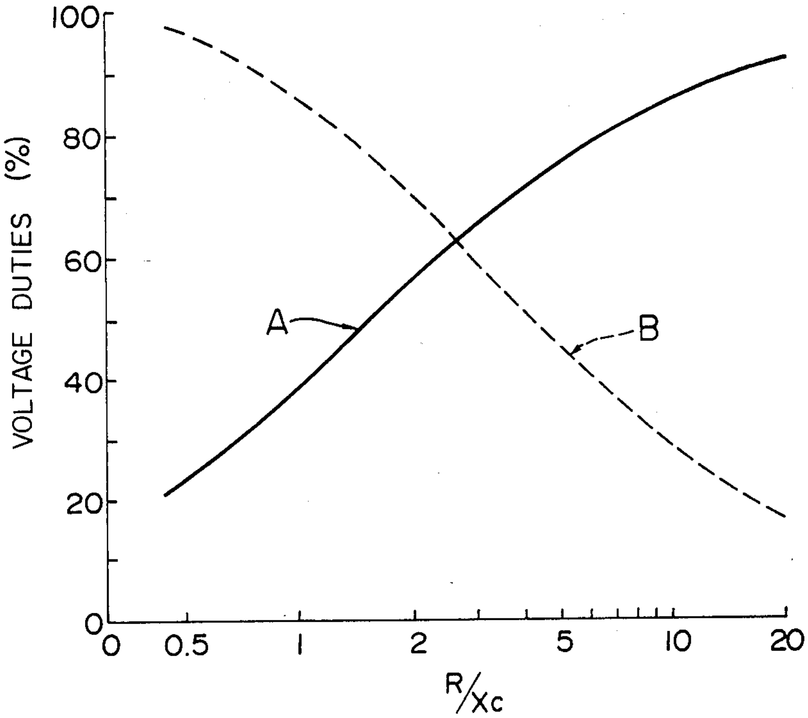
FIG. 2 PRIOR ART
FIG. 2 is a characteristic diagram showing the respective voltage duties across the main contact and the breaking resistor contact with respect to the breaking resistor.

On the assumption that $\omega L << 1/\omega C = X_c$, where L represents the value of the source inductance 2, R the resistance of the resistor element 4, C the electrostatic capacity of the capacitor 6, ω the angular frequency of the power source, the characteristic diagram can be obtained as shown in FIG. 2 in which the solid line curve A shows the voltage duty applied across the main contact 3 and the broken line curve B shows the voltage duty applied across the resistor contact 5.

For example, various changes depending on the value R of the breaking resistor with a constant line length (the electrostatic capacity C is constant) will be considered. In the case where R is small, the voltage drop RI due to the resistance R of the breaking resistor 4 and the current I passing through the resistor contact 5 is small and therefore the voltage duty applied across the main contact 3 is low, after the main contact 3 has been opened, while a high voltage which is substantially equal to the value with no breaking resistor is applied across the resistor contact 5 after the resistor contact 5 has been also opened because the resistance R is small. On the other hand, if the breaking resistance R becomes large, the voltage drop RI also becomes large and the voltage duty across the main contact 3 therefore increases, while the voltage duty across the resistor contact 5 becomes small as the breaking resistance R is large, as shown in FIG. 2, for such a reason that the voltage distribution across the capacity C of the capacitor 6 becomes small.

For example, on the assumption that in a UHV line, line length is 100–200 km, the source frequency f=50 Hz and $X_c \approx 2000$–1000 Ω, the value $R/X_c$ is 0.25–1.00 with the resistance R=500–1000 Ω.

As seen in FIG. 2, under the above-mentioned conditions, the voltage duties across the main contact 3 and the resistor contact 5 with the breaking resistor 4 are about 40% and 90%, respectively, of those in the case where no breaking resistor is provided. Thus, it can not be considered that the feature of the breaking resistor is sufficiently used, even if the breaking resistor is selected to a suitable value from the viewpoint of surge suppression. This is the reason why remarkable improvement in small capacitive current breaking performance is eagerly expected in the field of this art.

Referring to FIGS. 3 to 9 of the drawings, preferred embodiments of the present invention will now be described. In these drawings, the same reference numerals as those used in FIG. 1 are used to represent the same parts or components as those provided in FIG. 1, and therefore the description about such parts or components is omitted.

Figure 3:
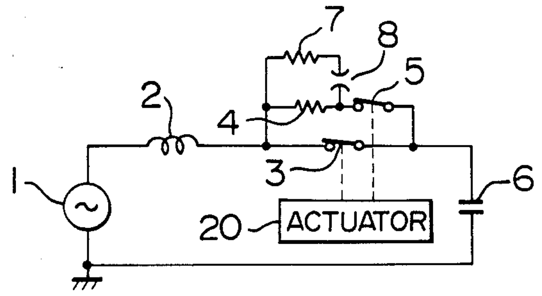
FIGS. 3 and 4 are circuit diagrams of a power transmission line provided with a breaking section of the circuit breaker according to an embodiment of the present invention.
Figure 4:
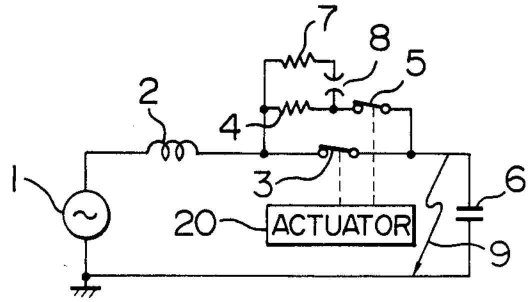

FIGS. 3 and 4 are circuit diagrams of a power transmission line provided with a breaking section of the circuit breaker according to an embodiment of the present invention.

In this embodiment, a series connection of another resistor element 7 (hereinafter referred to as a second resistor element) and a spark gap 8 is additionally connected in parallel to the first resistor element 4 (hereinafter referred to as a first resistor element) in the prior art of FIG. 1.

If the main contact 3 is opened to interrupt the current passing through the main contact 3 in the case where the small capacitive current passing through the capacitor 6 be interrupted in FIG. 3, a current flows through the first resistor element 4 and the resistor contact 5. Since the current passing through the capacitor 6 is small in comparison with the rated current or the rated breaking current of the circuit breaker, the voltage drop across the first resistor element 4 is also relatively small. Under this condition, the spark gap 8 is selected so as not to generate flashover thereacross and the resistance value R of the first resistor element 4 is selected to be large so as to satisfy, for example, the relation $R/X_c \approx 2$–3 by referring to FIG. 2. Thus, it becomes possible to further reduce the voltage duty across the resistor contact 5 (broken line curve B) by about 30% (from about 90% to 60%).

Further, since the substantially full voltage is applied to the first resistor element 4 when the main contact 3 is opened to interrupt a short-circuit current in case an earthing arc 9 occurs, as shown in FIG. 4, the spark gap 8 is selected such that flashover occurs thereacross with respect to such a high voltage across the first resistor 4. In this case, the first and second resistor elements 4 and 7 act as parallel connected components and therefore the resistance value of the second resistor element 7 is selected so that the resultant or equivalent resistance of the parallel connection of the first and second resistor elements 4 and 7 is equal to 500–1000 Ω which is considered suitable for suppressing the opening surge.

According to this embodiment, since the breaking resistance is selected to an optimum value in view of the breaking performance with respect to small capacitive current breaking as well as the suppression of short-circuit breaking surge and large short-circuit current breaking, the breaking performance can be greatly improved. Further, since the spark gap 8 is used a switching means, the switching operation can be surely achieved with a simple arrangement.

Figure 5:
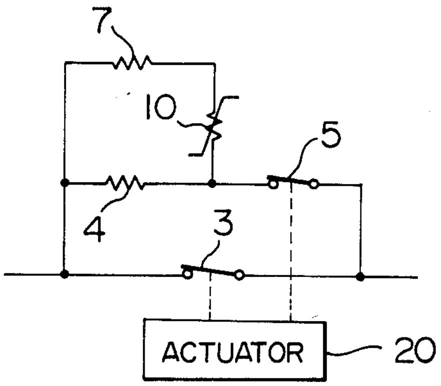
FIG. 5 is a circuit diagram of a breaking section of the circuit breaker according to another embodiment of the present invention.

FIG. 5 is a circuit diagram of a breaking section of the circuit breaker according to another embodiment of the present invention.

In this embodiment, a non-linear resistor element 10 is used as the switching means in place of the discharging gap 8 of the embodiment of FIGS. 3 and 4. Accordingly, the interrupting performance can be greatly improved, similarly to the embodiment of FIGS. 3 and 4, by switching the breaking resistance to have its optimum value, if the characteristic of the non-linear resistor element 10 is suitably selected such that the non-linear resistor element 10 operates to provide a high resistance value when the voltage drop across the first resistor element 4 is relatively low, for example, in the case of small capacitive current interruption, while operates to exhibit a relatively low resistance value when the voltage drop across the first resistor element 4 is large, for example, in the case of short-circuit current interruption. Further, this embodiment can exhibit such an effect that a stable operation characteristic having little variations in comparison with the case in which a spark gap is employed.

Figure 6:
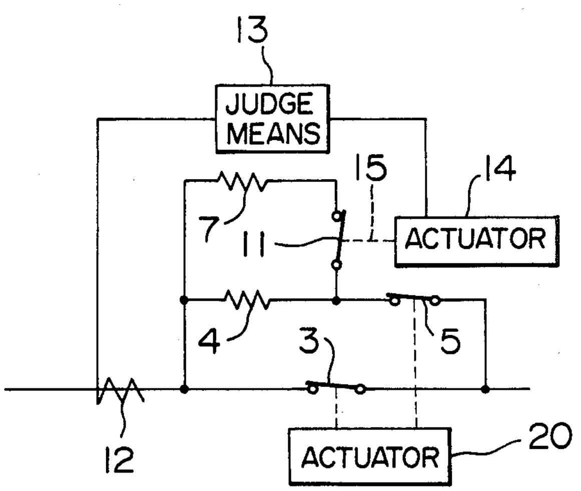
FIG. 6 is a circuit diagram of a breaking section of the circuit breaker according to a further embodiment of the present invention.

FIG. 6 is a circuit diagram of a breaking section of the circuit breaker according to a further embodiment of the present invention.

In this embodiment, as the switching means, there are provided a switch 11 connected in series with the second resistor element 7, a current detector 12 such as a current transformer (CT), a judge means 13 for judging whether the detected current I has become equal to or above a predetermined value $I_s$ or not, so as to produce a closing command when the detected current I has become $I \geqq I_s$, and an actuator 14 responsive to the closing command of the judge means 13 so as to close the switch 11. A broken line 15 designates a mechanical coupling between the switch 11 and the actuator 14. Thus, the actuator 14 mechanically actuates the switch 11 in the way conventionally known well, similarly to the actuator 20 for actuating the main and resistor contacts 3 and 5, by using energy on earth potential, electromagnetic force due to a short-circuit current flowing in the circuit, mechanical energy stored in a spring (not shown) which is compressed, for example, when the main contact is closed.

Accordingly, the breaking performance can be greatly improved also in this embodiment, similarly to the above-mentioned embodiments, by switching the breaking resistance to have its optimum value, if the abovementioned predetermined current value $I_s$ is set to a proper value.

Figure 7:
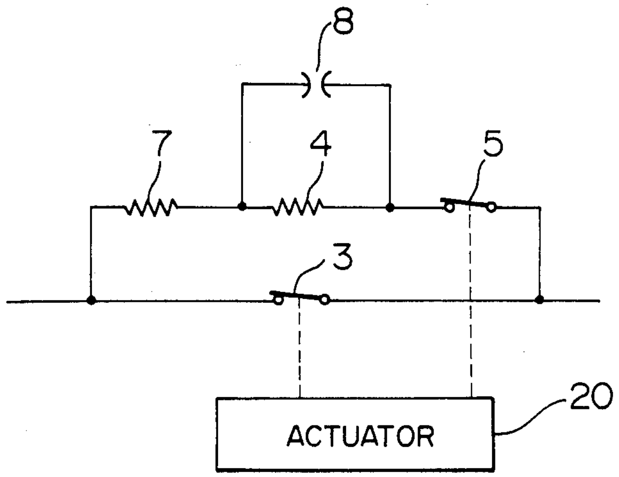
FIG. 7 is a circuit diagram of a breaking section of the circuit breaker according to a still further embodiment of the present invention.

FIG. 7 is a circuit diagram of a breaking section of the circuit breaker according to a still further embodiment of the present invention.

In this embodiment, the first and second resistor elements 4 and 7 are connected in series with each other differing from the various embodiments described above and a spark gap 8 is connected, as the switching means, in parallel to the first resistor element 4. Accordingly, the first and second resistor elements 4 and 7 operate in series in small capacitive current breaking to provide a large equivalent resistance value suitable for small capacitive current breaking, while in the case of shortcircuit current breaking, they operate to exhibit a low resistance value suitable for suppressing breaking surge merely owing to the resistance value of the second resistor element 7 because the first resistor element 4 is shorted by the spark gap 8 in short-circuit current interruption. Thus, the interrupting performance can be greatly improved also in this embodiment as in the various embodiments described above.

Figure 8:
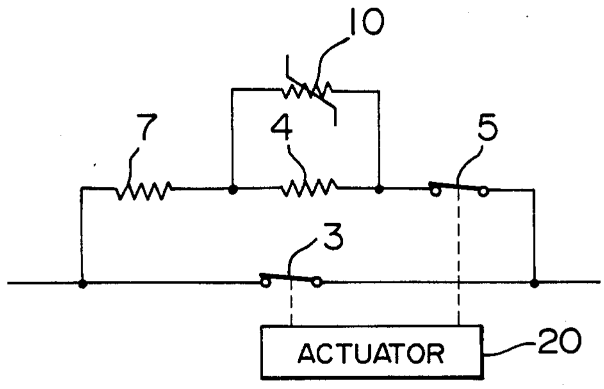
FIG. 8 is a circuit diagram of a breaking section of the circuit breaker according to a further embodiment of the present invention.
Figure 9:
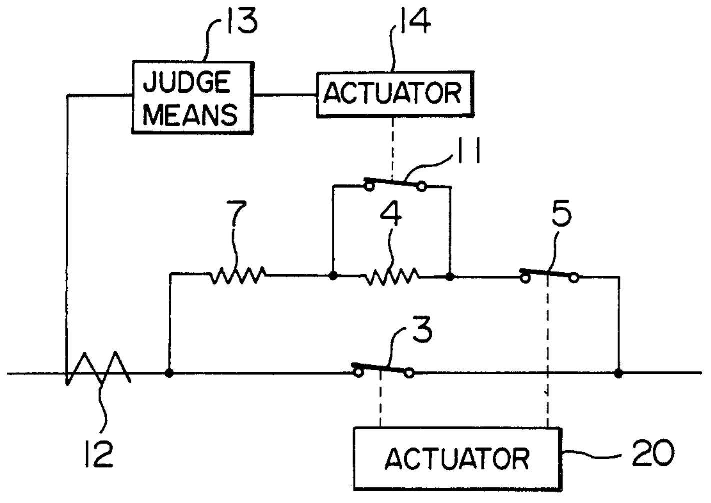
FIG. 9 is a circuit diagram of a breaking section of the circuit breaker according to a still further embodiment of the present invention.

The non-linear resistor element 10 of FIG. 5 and, alternatively, the switching means constituted by the switch 11, the current detector 12, the judge means 13, and the actuator 14 of FIG. 6 can be used in place of the spark gap 8 in this FIG. 7 embodiment, as shown in FIGS. 8 and 9, thereby obtaining the same effect as in the various embodiments mentioned above.

Although the above description has been made with respect to various embodiments of the circuit breaker which is provided with a single interruption, the present invention can be of course applied to a circuit breaker which has many interrupters per phase.

I claim:

1. A circuit breaker comprising a breaking section including an openable/closable main breaking contact and a series circuit connected in parallel to said main contact and constituted by a breaking resistor means and an openable/closable resistor contact; an actuator means for performing closing/opening operations of said main breaking contact and said resistor contact; said breaking resistor means including a first resistor element and second resistor element having a resistance value which is smaller than that of said first resistor element; and a switching means for automatically changing the connection of said first and second resistor elements in accordance with a current breaking condition so that for small capacitive current breaking, a resultant equivalent resistance of said first and second resistor elements becomes a large value suitable for the small capacitive current breaking, while for short-circuit current breaking, said equivalent resistance becomes a small value mainly owing to the resistance value of said second resistor element.

2. A circuit breaker according to claim 1, in which said first and second resistor elements are connected in parallel with each other, and in which said switching means is a spark gap connected in series to said second resistor element.

3. A circuit breaker according to claim 1, in which said first and second resistor elements are connected in parallel with each other, and in which said switching means is a non-linear resistor element connected in series to said second resistor element.

4. A circuit breaker according to claim 1, in which said switching means includes means for detecting a breaking current value and a switch arranged to be closed in response to said breaking current detecting means when the breaking current becomes equal to or above a predetermined value, and in which said second resistor element is connected, through said switch, in parallel to said first resistor element.

5. A circuit breaker according to claim 4, in which said breaking current detecting means includes a current transformer for detecting a current of a line to which said circuit breaker is connected, means for judging whether the current detected by said current transformer is equal to or above said predetermined value or not and for issuing a closing command when said detected current becomes equal to or above said predetermined value, and an actuator for closing said switch in response to said closing command.

6. A circuit breaker according to claim 1, in which said first and second resistor elements are connected in series with each other, and in which said switching means is a spark gap connected in parallel to said first resistor element.

7. A circuit breaker according to claim 1, in which said first and second resistor elements are connected in series with each other, and in which said switching means is a non-linear resistor element connected in parallel to said first resistor element.

8. A circuit breaker according to claim 1, in which said first and second resistor elements are connected in series with each other, and in which said switching means includes means for detecting breaking a breaking current value and a switch connected in parallel to said first resistor element and arranged to be closed in response to said breaking current detecting means when the breaking current becomes equal to or above a predetermined value.

9. A circuit breaker according to claim 8, in which said breaking current detecting means includes a current transformer for detecting a current of a line to which said circuit breaker is connected, means for judging whether the current detected by said current transformer is equal to or above said predetermined value or not and for issuing a closing command when said detecting current becomes equal to or above said predetermined value, and an actuator for closing said switch in response to said closing command.

10. A circuit breaker according to claim 1, wherein said switching means automatically changes the connection of said first and second resistor elements in response to the current breaking condition during a current breaking operation.

11. A circuit breaker according to claim 1, wherein said switching means operates to automatically change the connection of the first and second resistor in accordance with the current breaking condition subsequent to said actuator means opening said main breaking contact during a current breaking operation.

* * * * *